May 2, 1939.  E. W. HOY  2,156,289

RECORD CHART FOR AUTOMATIC RECORDING INSTRUMENTS

Filed April 13, 1937

Inventor
Edward W. Hoy

Albert R. Henrich
Attorney

Patented May 2, 1939

2,156,289

UNITED STATES PATENT OFFICE 2,156,289

RECORD CHART FOR AUTOMATIC RECORDING INSTRUMENTS

Edward W. Hoy, Buffalo, N. Y., assignor to Permochart Corporation, New York, N. Y., a corporation of New York Application April 13, 1937, Serial No. 136,620

1 Claim. (Cl. 234—75)

This invention relates to automatic recording instruments of the type employing a marking stylus and a record chart, and it has particular reference to a record chart therefor and to correlated improvements and discoveries designed to enhance the useful life of such charts. This application is a continuation-in-part of my application, Serial No. 28,341, filed June 25, 1935.

Many industrial processes are supervised or controlled through the use of an automatic recording instrument, in which, generally speaking, some condition of the operation, as temperature, voltage, pressure, or the like is recorded with reference to some other condition such as the time of operation. It is customary to make such records automatically by means of a recording instrument having a marking stylus and a record chart, the record being made by the relative movement of stylus and chart. Heretofore, it was customary to employ record charts having a record-surface having the characteristics of fibrous paper. Such paper charts are characterized inter alia by the disadvantages that the surface is relatively soft compared to the stylus so that the stylus frequently catches in the fibres of the paper and transmits disturbing stresses to the recording mechanism. Moreover, the paper surface is ink-absorbing so that it is obvious that such paper charts do not permit of the mark being removed by erasure for such operation would disrupt the fibres and render the surface rough and obliterate the graduations on the chart. Likewise, an ink eradicator of the solvent type would swell the paper and decolorize both the graduations as well as the mark applied by the stylus. From these facts it is clear that charts having a paper-recording surface are not designed to be reused so that it is necessary to use a new chart for each new record, thus necessitating carrying a large supply of such charts for each recording instrument.

Having in mind the above mentioned trade practices and disadvantages of prior charts, it is a general object of the present invention to provide a reusable record chart for automatic recording instruments.

It is another object of the invention to provide the combination of an automatic recording instrument and a record chart having a record-receiving surface of such character as to avoid transmitting disturbing stresses to the recording mechanism and to enable marks to be applied thereto to be removed readily to restore the chart to a condition for reuse.

Other objects of the invention will in part be obvious and will in part appear hereinafter.

According to the invention, there is provided the combination of an automatic recording instrument having a chart supporting means and an ink-bearing stylus cooperating therewith to automatically mark the upper surface of a record chart supported thereon, a flexible chart having a record-receiving surface which is sufficiently hard to resist deformation by the stylus and which is non-absorbent of the ink to enable the marking to be removed by wiping or erasure to restore the chart to a condition for reuse in the recording instrument.

The record chart of the invention may be formed of a composite laminated sheet material It is to be understood that the record-receiving surface of the chart is characterized by the above-mentioned properties which render is reusable. The record-receiving surface may be formed of any suitable non-fibrous film-forming material such, for example, as a plasticized cellulose derivative, such as a cellulose ester, a cellulose ether; also insolubilized gelatin, casein and synthetic resins such as phenol-formaldehyde resin, a glyptal resin, polymerized vinyl resin, and the like. These substances are characterized by forming pellicles which have smooth relatively hard surfaces which are insoluble in aqueous solvents. In the specification and claims, the expression "disc" is intended to include sheets, films and coatings formed of one or more of the above-mentioned non-fibrous materials wherever the sense permits.

The record chart of the invention may be given any required shape to adapt it for use on any type of recording instrument. For example, the chart is circular and may be provided with one or more suitable apertures to engage studs on the record holding plates of the instrument.

If desired, the record-receiving surface may be slightly matted, for example, by sandblasting or by treatment with a suitable agent to impart a fine-grained dull matte surface. The grain of the matte surface should be sufficiently fine so as to feel relatively smooth to the touch so that the stylus rides freely thereon, and substantially invisible so as to leave the non-fibrous pellicle transparent where transparency is necessary.

The invention is further explained by reference to the accompanying drawing, wherein.

Figure 1:
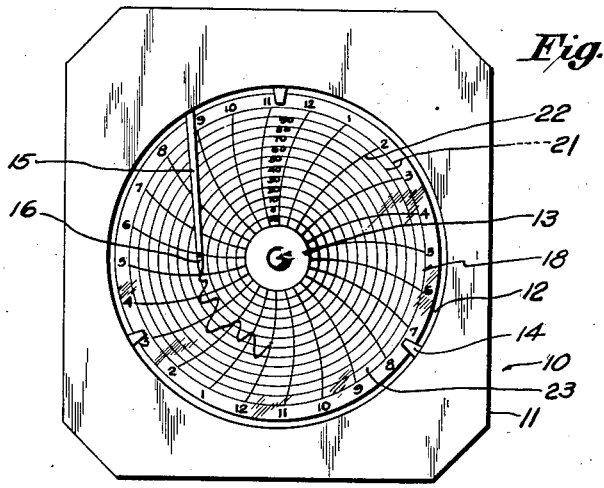
Fig. 1 is a front elevation of one embodiment of the improved recording instrument of the invention showing a disc recorder bearing the record chart of the invention.

For exemplary purposes, the record charts herein disclosed are shown of the disc form and adapted for use on the usual disc recorder 10 (Fig. 1), which includes a casing 11 containing suitable clockwork for rotating a turntable 12. A central stud 13 is provided in the turntable for locating the charts in concentricity therewith, while the periphery of the turntable is provided with spring clips 14 or other suitable means for clamping the chart in position. The casing may also contain a mechanism responsive to a variable, such as pressure, voltage, or temperature, for operating an arm 15 which is equipped with a stylus 16. As the operating details of such instruments are well known, it is deemed unnecessary to describe or illustrate them further.

Figure 2:
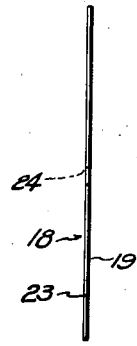
Fig. 2 is an edge view of the sheet of Fig. 1.

In the embodiment shown in Figs. 1 and 2, a circular record chart 18 is formed of transparent plasticized cellulose acetate or other transparent non-fibrous material heretofore mentioned, and it is provided on its back 19 with graduated circular markings 21 corresponding to the temperature variable and radial markings 22 corresponding to the time variable. The front face 23 of the chart is formed with a smooth matte finish adapted to receive the ink markings of the stylus. A central aperture 24 is formed in the chart for locating it on the turntable stud 13.

When the record chart of the invention is formed of a laminated sheet material, the laminated material may comprise a flexible backing sheet of paper, metal foil, and which is laminated, at least on the record-receiving side, with a film consisting of one of the above-described non-fibrous materials. More particularly, the backing sheet may be coated on at least the record-receiving side with a flexible composition comprising one or more of the above mentioned non-fibrous materials. With the laminated sheet-type of chart, any suitable graduations may be applied on the upper face of the non-fibrous material or, when this material is transparent, the graduations may be applied on an enclosed surface of the laminated sheet, for example, on the enclosed surface of the backing sheet.

Figure 4:
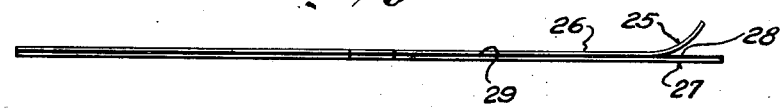
Fig. 4 is an enlarged edge view showing another embodiment of the record chart of the invention.

This laminated record may be formed of two discs, if desired (Fig. 4), the uppermost 25 being of Celluloid having its record-receiving surface 26 slightly matted, but otherwise unmarked, while the remaining disc 27 may be of paper cemented thereto, as indicated by the numeral 28, and containing the temperature and time markings on its face 29.

When the record chart embodies two separate sheets, these sheets may comprise a master sheet bearing graduations and preferably adapted to be permanently fixed to the instrument, and a separate transparent flexible sheet or film which is adapted to be removably disposed over the master sheet during marking by the stylus. The transparent removable sheet has the record-receiving surface of the type above described, so that the ink applied thereto by the stylus may be removed by wiping or erasure to restore the transparent sheet to a condition for reuse. The transparent flexible sheet or film may be formed of one or more of the above mentioned non-fibrous materials and this sheet or film may bear graduations on its record receiving surface and/or on the back of the sheet or film.

Figure 3:
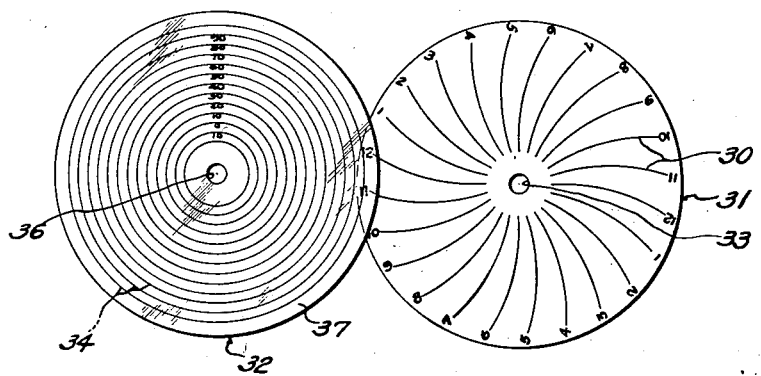
Fig. 3 is a plan view of complementary recording and time charts forming another embodiment of the invention.

In Fig. 3, there is shown one example of that embodiment of the article in which the record chart comprises two separable sheets. The lower sheet 31 may be of paper, and it is provided with radial time markings 30 and a central aperture 33. This sheet may, if desired, be permanently secured to the turntable 12, as the changing thereof is not necessary. The upper record-receiving sheet 32 may be formed of Celluloid, and it is provided only with circular markings 34 preferably on its rear face, corresponding to temperature, etc., and with a central aperture 36. The front face 37 of the sheet 32 may be slightly matted in a similar manner to the face 23 of the described sheet 18.

In using the chart of Fig. 3, the Celluloid sheet 32 may be positioned on the turntable without the trouble of rotatary alignment, since the time markings 30 on the underlying sheet 26 are clearly visible therethrough, and correctly reflect the time in relation to the position of the stylus. The front face 37 of the chart 32 receives the stylus markings, which may be observed during the time cycle, upon the completion of which the Celluloid sheet may be removed, cleaned, and replaced without disturbing the time sheet 31. This embodiment of the invention is particularly useful in lending convenience and in avoiding error in changing the sheets.

It will be apparent that the described record sheet may be applied to the turntable in the same manner as the previously used paper sheets, with the advantage, however, that the record-receiving face 26, being both unmarked and of a relatively hard finish, will receive ink lines perfectly and without transmitting disturbing stresses to the sensitive mechanism which operates the stylus. When the marking cycle is complete and the sheet has served its purpose, the markings may be readily erased or wiper off, thus conditioning the chart for subsequent use.

The marking ink now in common use with automatic recording instruments is one comprising a water-soluble organic coloring matter and a vehicle therefor which is usually water and a hygroscopic agent such as glycerine. Since the ink vehicle is aqueous and the record-receiving surface is substantially insoluble in the vehicle, the ink does not penetrate to any substantial depth and may be removed readily by wiping with a cloth moistened with a suitable aqueous solvent of the ink.

Having described my invention, what I claim as new and desire to secure by Letters Patent is:

As an article of manufacture, a circular record chart for automatic recording instruments having a circular chart-supporting member provided with a central stud and an ink-bearing stylus cooperating to automatically mark the upper surface of a chart supported on said member, said chart comprising, in combination, a disc of flexible composite material comprising a disc of flexible backing material adhesively united over its upper surface to a disc of flexible non-fibrous material having a smooth record-receiving upper surface which is sufficiently hard to resist deformation by said stylus and which is impermeable to the marking ink to enable the ink to be removed by wiping or erasure to restore the chart to a condition for reuse, said chart having graduations visible on its upper surface and being provided with a central aperture to engage said stud.

EDWARD W. HOY.